US012660032B2

(12) United States Patent
Liang et al.

(10) Patent No.: US 12,660,032 B2
(45) Date of Patent: Jun. 16, 2026

(54) COMMUNICATION PATH SWITCHING METHOD AND TERMINAL

(71) Applicant: VIVO MOBILE COMMUNICATION CO., LTD., Dongguan (CN)

(72) Inventors: Jing Liang, Dongguan (CN); Qian Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 245 days.

(21) Appl. No.: 18/374,727

(22) Filed: Sep. 29, 2023

(65) Prior Publication Data

US 2024/0023189 A1    Jan. 18, 2024

Related U.S. Application Data

(63) Continuation of application No. PCT/CN2022/083111, filed on Mar. 25, 2022.

(30) Foreign Application Priority Data

Mar. 30, 2021    (CN) .......................... 202110343630.9

(51) Int. Cl.
*H04W 76/25*        (2018.01)
*H04W 76/38*        (2018.01)

(52) U.S. Cl.
CPC ........... *H04W 76/25* (2018.02); *H04W 76/38* (2018.02)

(58) Field of Classification Search
None
See application file for complete search history.

(56) References Cited

U.S. PATENT DOCUMENTS

| | | | | |
|---|---|---|---|---|
| 10,624,146 B2 * | 4/2020 | Ma | ......................... | H04W 76/27 |
| 10,945,179 B2 | 3/2021 | Xu et al. | | |
| 2018/0213577 A1 * | 7/2018 | Burbidge | .............. | H04W 76/10 |
| 2019/0387446 A1 * | 12/2019 | Xu | .................... | H04W 36/0061 |
| 2021/0051556 A1 | 2/2021 | Lin et al. | | |

(Continued)

FOREIGN PATENT DOCUMENTS

| | | |
|---|---|---|
| CN | 109417695 B | 10/2020 |
| CN | 112514520 A | 3/2021 |

(Continued)

OTHER PUBLICATIONS

3rd Generation Partnership Project, "Technical Specification Group Access Network, NG-RAN, NG Application Protocol (NGAP) (Release 15)", 3GPP TS 38.413 V0.9.0 , May 2018.
Intel Corporation, "Inter-gNB Path Switching for L2 U2N Relay", 3GPP TSG RAN WG2 Meeting #113e, e-Meeting, Jan. 25-Feb. 5, 2020, R2-2101300.
Qualcomm Incorporated, "Service continuity of L2 U2N relay", 3GPP TSG RAN WG2 Meeting #114-e, e-Conference, May 19-27, 2021, R2-2104739.

(Continued)

*Primary Examiner* — Christopher T Wyllie
(74) *Attorney, Agent, or Firm* — The Webb Law Firm

(57)        ABSTRACT

A communication path switching method includes receiving a reconfiguration message; and starting a target timer in a process of switching from a first path to a second path based on the reconfiguration message. The reconfiguration message is used for indicating the remote UE to switch from the first path to the second path. The first path includes a direct connection between the remote UE and a first base station, and the second path includes a connection between the remote UE and a second base station via a first relay UE. The target timer is used for the remote UE to determine a switching result of switching from the first path to the second path.

20 Claims, 6 Drawing Sheets

300

(56)                References Cited

U.S. PATENT DOCUMENTS

| | | | | | |
|---|---|---|---|---|---|
| 2021/0144606 | A1* | 5/2021 | Xu | .................. | H04W 76/10 |
| 2022/0361056 | A1* | 11/2022 | Jin | .................. | H04W 8/08 |
| 2023/0077496 | A1* | 3/2023 | Cheng | .................. | H04W 76/19 |
| | | | | | 370/328 |
| 2023/0363020 | A1* | 11/2023 | Back | .................. | H04W 76/20 |
| 2024/0023189 | A1* | 1/2024 | Liang | .................. | H04W 76/25 |
| 2024/0064838 | A1* | 2/2024 | Orsino | .................. | H04W 40/36 |
| 2024/0179611 | A1* | 5/2024 | Chen | .................. | H04W 76/19 |

FOREIGN PATENT DOCUMENTS

| | | | | | |
|---|---|---|---|---|---|
| CN | 111034334 | B | 1/2022 | | |
| JP | 2013115465 | A | 6/2013 | | |
| JP | 2023554677 | A | 12/2023 | | |
| WO | WO-2017004720 | A1 * | 1/2017 | .......... | H04B 7/2606 |
| WO | WO-2017219289 | A1 * | 12/2017 | .......... | H04W 88/04 |
| WO | 2018006253 | A1 | 1/2018 | | |
| WO | 2020259811 | A1 | 12/2020 | | |
| WO | 2022042146 | A1 | 3/2022 | | |
| WO | 2022136387 | A1 | 6/2022 | | |

OTHER PUBLICATIONS

Zte Corporation et al., "Discussion on remaining issues on service continuity", 3GPP TSG RAN WG2 Meeting #116bis electronic, Online, Jan. 17-26, 2022, R2-2201346.

Intel Corporation, "Characteristics of L2 and L3-based Sidelink Relaying", 3GPP TSG-RAN WG2 Meeting #111e, E-Meeting, Aug. 17-28, 2020, R2-2006718.

Intel Corporation, "Inter-gNB Path Switching for L2 U2N Relay", 3GPP TSG RAN WG2 Meeeting #113e, e-Meeting, Jan. 25-Feb. 5, 2020, R2-2101300.

LG Electronics Inc., "Service continuity for Remote Ue", 3GPP TSG-RAN WG2 Meeting #112e, Online Meeting, Nov. 2-13, 2020, R2-2010659.

NTT Docomo, Inc., "Summary of email discussion on handover failure handling", 3GPP TSG RAN WG2 #61, Sorrento, Italy, Feb. 11-15, 2008.

Panasonic, "Handover procedure and failure handling", 3GPP TSG RAN WG2 #61bis, Mar. 31-Apr. 4, 2008, R2-081570.

* cited by examiner

200

300

400

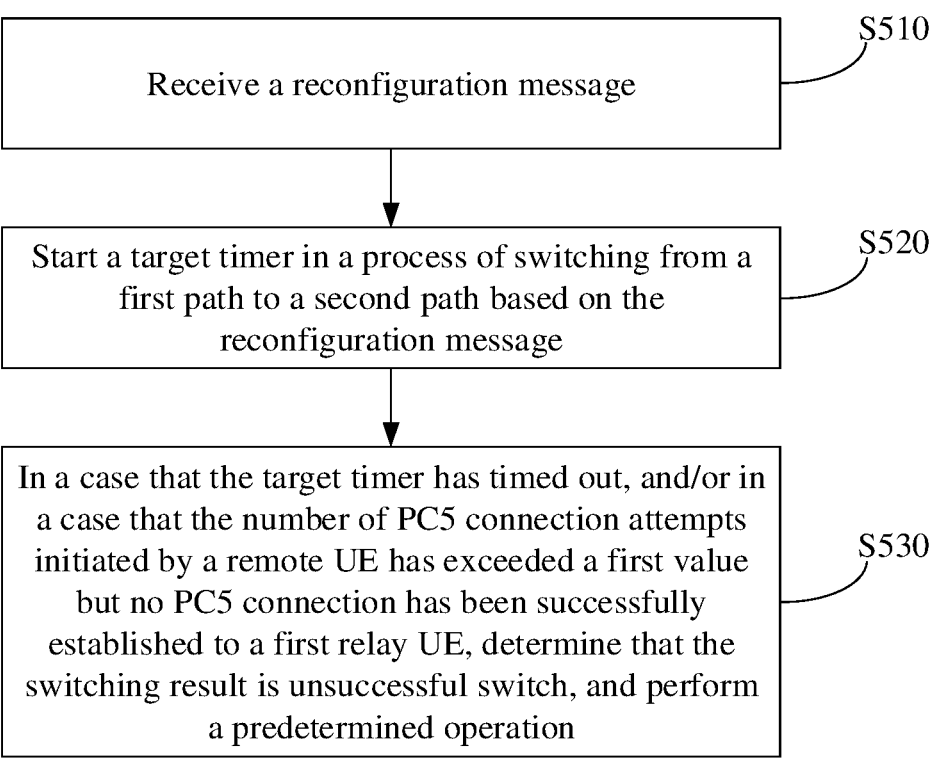

500

Receive a reconfiguration message — S510

Start a target timer in a process of switching from a first path to a second path based on the reconfiguration message — S520

In a case that the target timer has timed out, and/or in a case that the number of PC5 connection attempts initiated by a remote UE has exceeded a first value but no PC5 connection has been successfully established to a first relay UE, determine that the switching result is unsuccessful switch, and perform a predetermined operation — S530

COMMUNICATION PATH SWITCHING METHOD AND TERMINAL

CROSS-REFERENCE TO RELATED APPLICATIONS

This application is a Bypass Continuation Applications of International Patent Application No. PCT/CN2022/083111, filed Mar. 25, 2022, and claims priority to Chinese Patent Application No. 202110343630.9, filed Mar. 30, 2021, the disclosures of which are hereby incorporated by reference in their entireties.

BACKGROUND OF THE INVENTION

Field of the Invention

This application pertains to the field of wireless communication technologies, and particularly relates to a communication path switching method and apparatus and a terminal.

Description of Related Art

Communication systems such as a 5th generation new radio (5G NR) system and a long term evolution (LTE) system support sidelink (SL) transmission, which allows direct data transmission between user equipments (UE, that is, remote UE) at the physical layer without using a network-side device.

SUMMARY OF THE INVENTION

According to a first aspect, a communication path switching method is provided, performed by a remote UE. The method includes: receiving a reconfiguration message, where the reconfiguration message is used for indicating the remote UE to switch from a first path to a second path, where the first path includes a direct connection between the remote UE and a first base station, and the second path includes a connection between the remote UE and a second base station via a first relay UE; and starting a target timer in a process of switching from the first path to the second path based on the reconfiguration message, where the target timer is used for the remote UE to determine a switching result of switching from the first path to the second path.

According to a second aspect, a communication path switching apparatus is provided. The apparatus includes: a receiving module configured to receive a reconfiguration message, where the reconfiguration message is used for indicating the remote UE to switch from a first path to a second path, where the first path includes a direct connection between the remote UE and a first base station, and the second path includes a connection between the remote UE and a second base station via a first relay UE; and a switch module configured to start a target timer in a process of switching from the first path to the second path based on the reconfiguration message, where the target timer is used for the remote UE to determine a switching result of switching from the first path to the second path.

According to a third aspect, a terminal is provided, where the terminal includes a processor, a memory, and a program or instructions stored in the memory and executable on the processor, and when the program or instructions are executed by the processor, the steps of the method according to the first aspect are implemented.

According to a fourth aspect, a terminal is provided, including a processor and a communication interface, where the communication interface is coupled to the processor, and the processor is configured to execute a program or instructions to implement the method according to the first aspect.

According to a fifth aspect, a non-transitory computer-readable storage medium is provided, where the non-transitory computer-readable storage medium stores a program or instructions, and when the program or instructions are executed by a processor, the steps of the method according to the first aspect are implemented.

According to a sixth aspect, a chip is provided, where the chip includes a processor and a communication interface, the communication interface is coupled to the processor, and the processor is configured to execute a program or instructions to implement the method according to the first aspect.

According to a seventh aspect, a computer program/program product is provided, where the computer program/program product is stored in a non-transit storage medium, and the program/program product is executed by at least one processor to implement the steps of the method according to the first aspect.

BRIEF DESCRIPTION OF THE DRAWINGS

FIG. 5 is a schematic flowchart of a communication path switching method according to another example embodiment of this application.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that the terms used in this way are interchangeable in appropriate circumstances such that the embodiments of this application can be implemented in other orders than the order illustrated or described herein. In addition, objects distinguished by "first" and "second" are generally of a same type, and the quantities of the objects are not limited. For example, there may be one or more first objects. In addition, "and/or" in the specification and claims represents at least one of connected objects, and the character "I" generally indicates that the contextually associated objects have an "or" relationship.

It is worth noting that the technologies described in the embodiments of this application are not limited to long term evolution (LTE)/LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and NR terms are used in most of the following descriptions, but these technologies may also be applied to other applications than an NR system application, for example, the 6th generation (6G) communication system.

Figure 1:
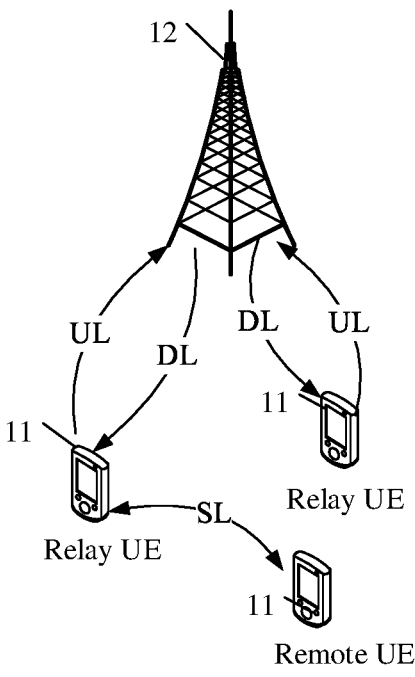
FIG. 1 is a schematic structural diagram of a wireless communication system according to an example embodiment of this application.

FIG. 1 is a schematic structural diagram of a wireless communication system to which embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a smartwatch, a wrist band, earphones, glasses, and the like. It should be noted that a type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a wireless local area network (WLAN) access point, a Wi-Fi node, a transmission reception point (TRP), or other appropriate terms in the art. Provided that the same technical effects are achieved, the base station is not limited to any specific technical term. It should be noted that in the embodiments of this application, only the base station in the NR system is used as an example, although the type of the base station is not limited.

In some communication scenarios, a remote UE needs to transmit data with the network-side device 12. However, due to poor coverage, the remote UE requires a relay UE to forward data for it. The relay UE and the network-side device 12 may be connected via a Uu interface, and the relay UE and the remote UE may be connected via a sidelink (SL) interface, where the SL interface may also be referred to as a PC5 interface. Generally, the relay UE is open to serve any remote UE.

With regard to communication path switch in an SL relay scenarios, for example, a terminal needs to switch from a communication path directly connected to a base station to a communication path indirectly connected to the base station via a relay terminal, there still lacks a reliable switch process to ensure the smooth execution of the switch process.

The following describes in detail the technical solutions provided in the embodiments of this application through some embodiments and application scenarios thereof with reference to the accompanying drawings.

It should be noted that in the communication path switching method provided in the embodiments of this application, the roles of the remote UE and the relay UE are interchangeable according to the communication scenarios. For example, in some communication scenarios, the remote UE may serve as a relay UE for uplink and downlink data forwarding, and in some other communication scenarios, the relay UE may serve as a remote UE, which are not limited in the embodiments.

Figure 2:
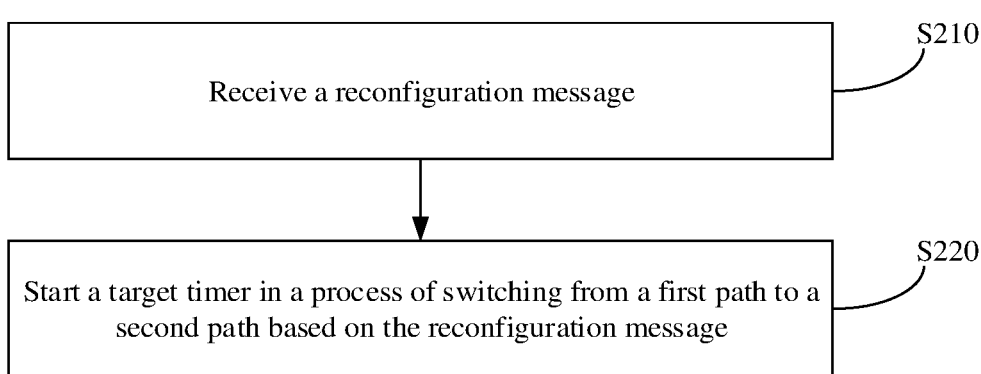
FIG. 2 is a schematic flowchart of a communication path switching method according to an example embodiment of this application.

FIG. 2 is a schematic flowchart of a communication path switching method 200 according to an example embodiment of this application. The method 200 may, but is not limited to, be performed by a terminal (for example, a remote UE), and for example, may be performed by hardware and/or software installed in the terminal. In this embodiment, the method 200 may at least include the following steps.

S210. Receive a reconfiguration message.

The reconfiguration message (or understood as a switch command) is used for indicating the remote UE to switch from a first path to a second path, where the first path includes a direct connection between the remote UE and a first base station, and the second path includes a connection between the remote UE and a second base station via a first relay UE. For example, referring to FIG. 1 again, the first path may be a direct connection between the terminal 11 and the base station 12, and the second path may be an indirect connection between the terminal 11 and the base station 12 via another terminal 11. It should be noted that the foregoing first base station and second base station may be a same base station or different base stations, which is not limited in this embodiment.

In a possible implementation, in addition to indicating the remote UE to switch from the first path to the second path, the reconfiguration information may also indicate information about at least one first relay UE, for example, identification information of the first relay UE.

It can be understood that in a case that the reconfiguration message indicates the presence of multiple relay UEs, the first relay UE may be any one of the multiple relay UEs. Optionally, the first relay UE may be agreed upon through a protocol or configured through higher layer signaling, which is not limited herein.

S220. Start a target timer in a process of switching from the first path to the second path based on the reconfiguration message.

The target timer is used for the remote UE to determine a switching result (such as switch failure, switch success, or switch in progress) of switching from the first path to the second path. In this way, the remote UE can be clear about the result of the communication path switch based on an operation state of the target timer, thereby ensuring smooth execution of the communication path switching process. Optionally, the start timing of the target timer may be agreed upon by a protocol or may be configured by higher layer signaling, which is not limited herein.

In this embodiment, in a possible implementation, the target timer includes any one of the following (1) and (2):

(1) a timer dedicated to switching of the remote UE from the first path to the second path.

The timer is dedicated to switching of the remote UE from the first path to the second path. In this embodiment, the value of the timer may be specified by a protocol or configured by higher layer signaling or a network-side device.

(2) a designated timer used in switching from the first path to a third path, where the third path includes a direct connection between the remote UE and a third base station.

The designated timer may be an existing timer such as T304. However, it should be noted that in this embodiment, the value of the designated timer is adapted to the switch process of switching from the first path to the second path. For example, in the case of switching from the first path to the third path (that is, when the remote UE is directly connected to a third base station), the value of the designated timer is first time; and in the case of switching from the first path to the second path, the value of the designated timer is second time, where the second time is different from the first time (for example, the first time is greater than the second time or the first time is less than the second time), or the second time is the same as the first time. Optionally, the value of the designated timer may be agreed upon by a protocol or configured by a base station.

In this embodiment, the remote UE receives a reconfiguration message, and starts a target timer in the process of switching from the first path to the second path based on the reconfiguration message. This allows the remote UE to be clear about the result of the communication path switch, thereby ensuring the smooth execution of the communication path switching process.

Figure 3:
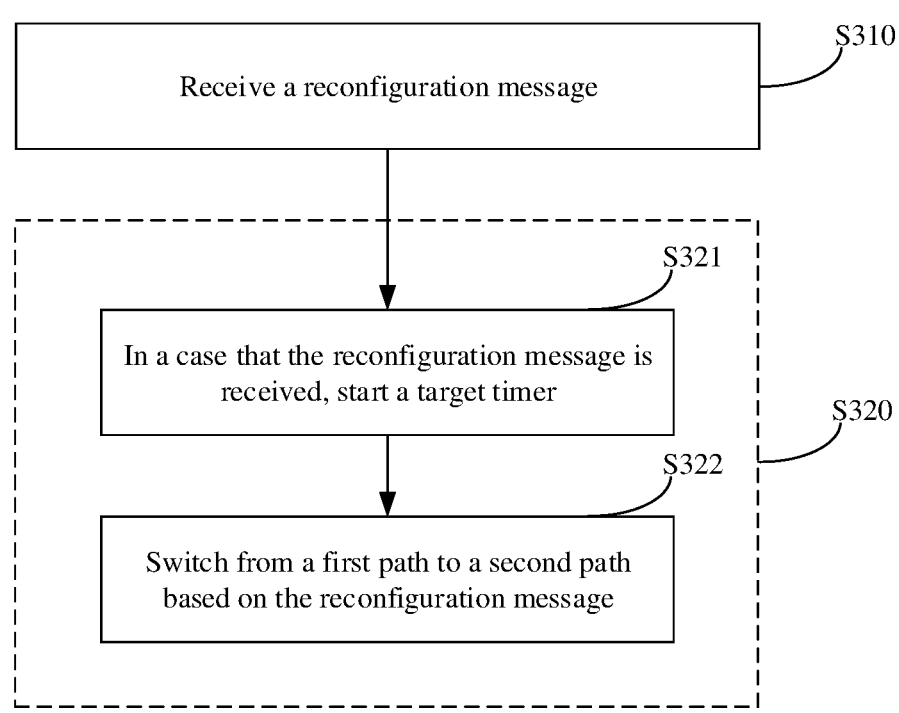
FIG. 3 is a schematic flowchart of a communication path switching method according to another example embodiment of this application.

FIG. 3 is a schematic flowchart of a communication path switching method 300 according to an example embodiment of this application. The method 300 may, but is not limited to, be performed by a terminal (for example, a remote UE), and for example, may be performed by hardware and/or software installed in the terminal. In this embodiment, the method 300 may at least include the following steps.

S310. Receive a reconfiguration message.

The reconfiguration message is used for indicating the remote UE to switch from a first path to a second path, where the first path includes a direct connection between the remote UE and a first base station, and the second path includes a connection between the remote UE and a second base station via a first relay UE.

It can be understood that for the implementation process of S310, reference may be made to the related description in the foregoing method embodiment 200. Apart from that, in a possible implementation, in a case that the reconfiguration message indicates multiple relay UEs, the remote UE may select a candidate first relay UE from the multiple relay UEs based on a relay reselection procedure, and then attempt to establish a PC5 connection to that candidate first relay UE to implement communication path switch.

S320. Start a target timer in a process of switching from the first path to the second path based on the reconfiguration message.

The target timer is used for the remote UE to determine a switching result of switching from the first path to the second path.

It should be understood that for the implementation process of S320, reference may be made to the related description in the method embodiment 200. Apart from that, in a possible implementation of this embodiment, the implementation process of S320 may include but is not limited to S321 and S322. Details are as follows:

S321. In a case that the reconfiguration message is received, start the target timer.

For related descriptions of the reconfiguration message and target timer described in S321, reference may be made to the related descriptions in the foregoing method embodiment 200, and details are not repeated herein again.

S322. Switch from the first path to the second path based on the reconfiguration message.

The process of switching from the first path to the second path may include but is not limited to that the remote UE establishes a PC5 connection (that is, a sidelink connection, which may include a PC5-S connection, a PC5-RRC connection, and/or the like) to the first relay UE, that the remote UE sends a radio resource control (RRC) reconfiguration message, that the first relay UE initiates a random access procedure, and the like. This is not limited herein.

In this case, in a possible implementation, the remote UE may determine that the path switch is successful and stop the target timer in a case that at least one of the following (1), (2) or (3) is satisfied.

(1) The remote UE has successfully established a PC5 connection to the first relay UE.

It can be understood that in a case that the reconfiguration message indicates the presence of multiple relay UEs, and that the remote UE is able to successfully establish a PC5 connection to at least one (or any one) of the multiple relay UEs, it is determined that the remote UE has successfully established a PC5 connection (including a PC5-S connection and/or a PC5-RRC connection) to the first relay UE.

For example, if the reconfiguration message indicates that there is information about multiple relay UEs, when the remote UE fails to establish a PC5 connection to one of these relay UEs, the remote UE may attempt to establish a PC5 connection to one or more other relay UEs. If a PC5 connection has been successfully established to at least one of the relay UEs, it is determined that the remote UE has successfully established a PC5 connection to the first relay UE.

In a possible embodiment, the remote UE may suspend the target timer in a case that establishment of a PC5 connection to the first relay UE starts; and continue to run the target timer in a case that the remote UE has successfully established a PC5 connection to the first relay UE.

(2) The remote UE has successfully sent an RRC reconfiguration message to a fourth base station.

The remote UE may successfully send the RRC reconfiguration message to the fourth base station via the first relay UE. In this embodiment, the fourth base station may be the same as or different from the second base station, which is not limited herein.

(3) The first relay UE has successfully completed a random access procedure with a fifth base station.

The fifth base station may be the same as or different from the base station sending the reconfiguration message. In other words, the fifth base station may be the same as or different from the second base station, which is not limited herein.

In this embodiment, the remote UE starts a target timer when a reconfiguration message is received, then switches from the first path to the second path based on the reconfiguration message, and finally, stops the target timer when a predetermined condition is met. This can ensure the smooth execution of the communication path switching process.

Figure 4:
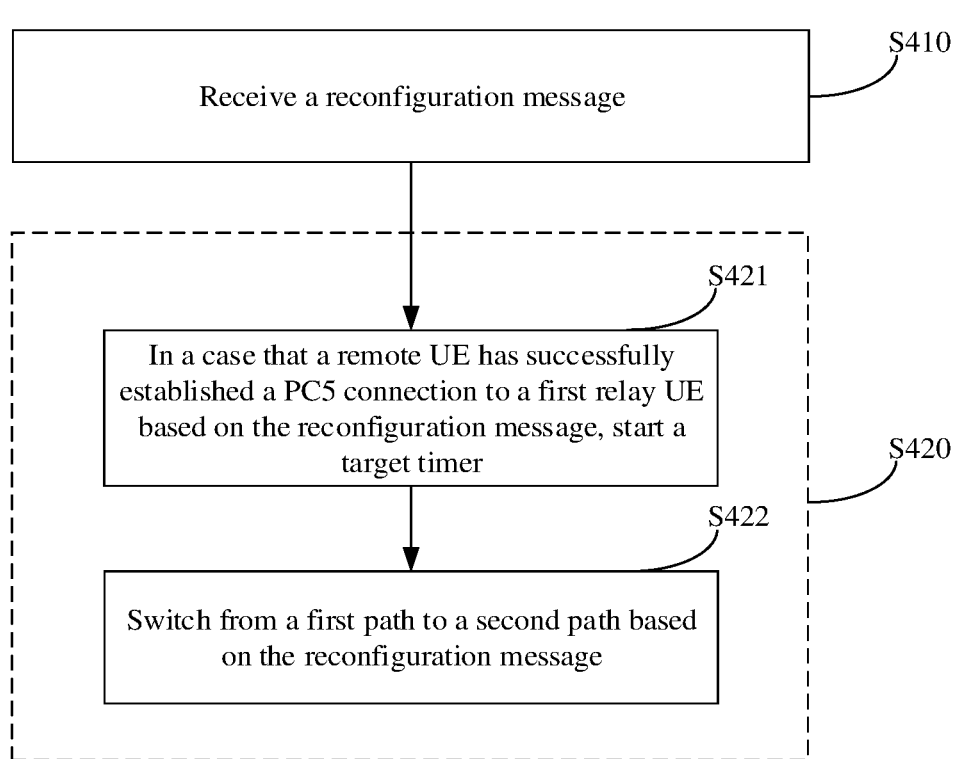
FIG. 4 is a schematic flowchart of a communication path switching method according to another example embodiment of this application.

FIG. 4 is a schematic flowchart of a communication path switching method 400 according to an example embodiment of this application. The method 400 may, but is not limited to, be performed by a terminal, and for example, may be performed by hardware and/or software installed in the terminal. In this embodiment, the method 400 may at least include the following steps.

S410. Receive a reconfiguration message.

The reconfiguration message is used for indicating the remote UE to switch from a first path to a second path, where the first path includes a direct connection between the remote UE and a first base station, and the second path includes a connection between the remote UE and a second base station via a first relay UE.

It can be understood that for implementation process of S410, reference may be made to related descriptions in the foregoing method embodiments 200 and/or 300. To avoid repetition, details are not described herein again.

S420. Start a target timer in a process of switching from the first path to the second path based on the reconfiguration message.

The target timer is used for the remote UE to determine a switching result of switching from the first path to the second path.

It can be understood that for the implementation process of S420, reference may be made to the related description in the method embodiments 200 and/or 300. Apart from that, in a possible implementation of this embodiment, the implementation process of S420 may include but is not limited to S421 and S422. Details are as follows:

S421. Start the target timer in a case that the remote UE has successfully established, based on the reconfiguration message, a PC5 connection to the first relay UE.

For related descriptions of the reconfiguration message and target timer described in S321, reference may be made to the related descriptions in the foregoing method embodiments 200 and/or 300, and details are not repeated herein again.

It can be understood that in a case that the reconfiguration message indicates the presence of multiple relay UEs, and that the remote UE is able to successfully establish a PC5 connection to at least one (or any one) of the multiple relay UEs, it is determined that the remote UE has successfully established a PC5 connection (that is, a sidelink connection, including a PC5-S connection and/or a PC5-RRC connection) to the first relay UE.

S422. Switch from the first path to the second path based on the reconfiguration message.

Similar to the foregoing S322, in S422, the process of switching from the first path to the second path may include but is not limited to that the remote UE has successfully sent an RRC reconfiguration message, that the first relay UE initiates a random access procedure, and the like.

In this case, in a possible implementation, the remote UE may determine that the path switch is successful and stop the target timer in a case that at least one of the following (1) or (2) is satisfied.

(1) The remote UE has successfully sent an RRC reconfiguration message to a fourth base station.

The remote UE may successfully send the RRC reconfiguration message to the fourth base station via the first relay UE. In this embodiment, the fourth base station may be the same as or different from the second base station, which is not limited herein.

(2) The first relay UE has successfully completed a random access procedure with a fifth base station.

The fifth base station may be the same as or different from the base station sending the reconfiguration message. In other words, the fifth base station may be the same as or different from the second base station, which is not limited herein.

In this embodiment, the remote UE starts a target timer when a PC5 connection has been successfully established to the first relay UE, then switches from the first path to the second path based on the reconfiguration message, and finally, stops the target timer when a predetermined condition is met. This can ensure the smooth execution of the communication path switching process.

FIG. 5 is a schematic flowchart of a communication path switching method 500 according to an example embodiment of this application. The method 500 may, but is not limited to, be performed by a terminal (for example, a remote UE), and for example, may be performed by hardware and/or software installed in the terminal. In this embodiment, the method 500 may at least include the following steps.

S510. Receive a reconfiguration message.

The reconfiguration message is used for indicating the remote UE to switch from a first path to a second path, where the first path includes a direct connection between the remote UE and a first base station, and the second path includes a connection between the remote UE and a second base station via a first relay UE.

S520. Start a target timer in a process of switching from the first path to the second path based on the reconfiguration message.

The target timer is used for the remote UE to determine a switching result of switching from the first path to the second path.

It can be understood that for implementation processes of S510 and S520, reference may be made to related descriptions in the foregoing method embodiments 200 to 400. To avoid repetition, details are not described herein again.

S530. In a case that the target timer has expired, and/or in a case that the number of PC5 connection attempts initiated by the remote UE has exceeded a first value but no PC5 connection has been successfully established to the first relay UE, determine that the switching result is unsuccessful switch, and perform a predetermined operation, where the predetermined operation includes at least one of the following operation (1), (2) or (3):

(1) initiating, by the remote UE, an RRC connection re-establishment procedure.

(2) initiating, by the remote UE, a switching failure reporting procedure, and reporting information related to path switching failure.

The reporting, by the remote UE, information related to the failure to the base station means that during the communication path switching process, in a case that the remote UE can still maintain a connection with the original base station, for example, the remote UE does not disconnect from the original base station (for example, configures a DAPS-Dual Active Protocol Stack bearer), the remote UE can report the information to the original base station; or during the communication path switching process, in a case that the base station that initiates path switch is one of the base stations serving the remote UE (such as a master cell group (MCG) or a secondary cell group (SCG)) and the remote UE is also connected to another base station (such as an SCG or an MCG), the remote UE can report the information to the another base station.

The information related to the path switching failure may include an identity (ID) of the first relay UE experiencing switch failure, a switch failure cause, and the like. This is not limited herein.

(3) initiating, by the remote UE, a relay UE reselection procedure, and/or establishing a PC5 connection to a second relay UE that has been reselected.

Optionally, the second relay UE satisfies any one of the following (3a) and (3b):

(3a) being obtained through relay UE reselection initiated by the remote UE. For example, the remote UE may perform relay reselection based on a relay reselection procedure.

(3b) being obtained through indication of the reconfiguration message, where the second relay UE or the third relay UE is a relay UE other than the first relay UE in multiple relay UEs indicated by the reconfiguration message.

It can be understood that the second relay UEs obtained based on the foregoing (3a) and (3b) may be the same or different, which is not limited herein.

For example, in this embodiment, the remote UE may keep trying to establish a connection to a new relay UE (that is, the second relay UE mentioned above) before the target timer expires and/or before the number of PC5 connection attempts exceeds N (that is, a first value). The first value may be agreed upon by a protocol or configured by a base station, or may be determined according to the number of relay UEs indicated by the reconfiguration message, which is not limited herein.

Optionally, apart from the above embodiments, in a possible embodiment, in a case that the target timer has not expired and the remote UE has not successfully established a PC5 connection to the first relay UE, and/or in a case that the number of PC5 connection attempts initiated by the remote UE has not exceeded a first value and the remote UE has not successfully established a PC5 connection to the first relay UE, the remote UE may perform at least one of the following operation (1) or (2):

(1) initiating, by the remote UE, an RRC connection re-establishment procedure; and (2) initiating, by the remote UE, a relay UE reselection procedure, and/or establishing a PC5 connection to a third relay UE that has been reselected.

The third relay UE may satisfy any one of the following (2a) or (2b):

(2a) being obtained through relay UE reselection initiated by the remote UE; and (2b) being obtained through indication of the reconfiguration message, where the third relay UE is a relay UE other than the first relay UE in multiple relay UEs indicated by the reconfiguration message.

It should be understood that for the implementation process of this implementation, reference may be made to the implementation process of S530. For example, for the related description of the third relay UE, reference may be made to the description of the second relay UE, . . . . To avoid repetition, details are not described herein again.

In this embodiment, the remote UE may determine, based on whether the target timer has expired, and/or whether the number of PC5 connection attempts has exceeded a predetermined value, whether to perform a subsequent switch operation, for example, whether to initiate an RRC connection re-establishment procedure or whether to initiate a relay UE reselection procedure, thereby ensuring reliable execution of the switch process and improving performance of the wireless communication system.

In addition, the foregoing method embodiments 200 to 500 in this embodiment may be applicable to an L2 architecture and an L3 architecture. The L2 architecture is characterized in that the relay UE does not have a complete protocol stack for forwarding data. That is, apart from basic layer 2 (L2) transmission protocol stacks such as radio link control (RLC), media access control (MAC), and physical layer (PHY), the relay UE does not have corresponding protocol stacks such as RRC, service data adaptation protocol (SDAP), and packet data convergence protocol (PDCP). Only the RLC bearer is used to carry and transmit data of the remote UE.

The L3 architecture is characterized in that the relay UE has a complete protocol stack. That is, in addition to the basic L2 transmission protocol stacks such as RLC, MAC, and PHY, the relay UE also has protocol stacks such as RRC, SDAP, and PDCP (which are only examples, not all of them are present), used for carrying and transmitting data of the remote UE.

It should be noted that the communication path switching method provided in the embodiments of this application may be performed by a communication path switching apparatus or a control module for executing the communication path switching method in the communication path switching apparatus. In the embodiments of this application, the communication path switching method being performed by the communication path switching apparatus is used as an example to describe the communication path switching apparatus according to the embodiments of this application.

Figure 6:
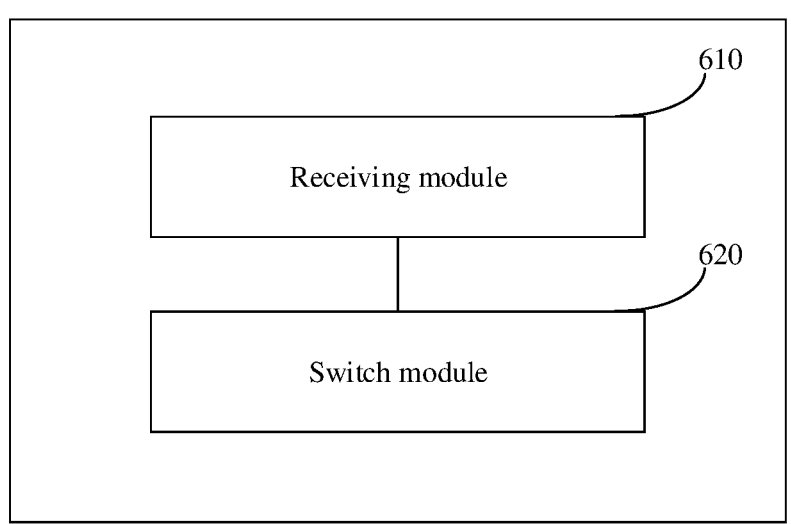
FIG. 6 is a schematic structural diagram of a communication path switching apparatus according to an example embodiment of this application.

FIG. 6 is a schematic structural diagram of a communication path switching apparatus 600 according to an example embodiment of this application. The apparatus 600 includes: a receiving module 610 configured to receive a reconfiguration message, where the reconfiguration message is used for indicating the remote UE to switch from a first path to a second path, where the first path includes a direct connection between the remote UE and a first base station, and the second path includes a connection between the remote UE and a second base station via a first relay UE; and a switch module 620 configured to start a target timer in a process of switching from the first path to the second path based on the reconfiguration message, where the target timer is used for the remote UE to determine a switching result of switching from the first path to the second path.

Optionally, the target timer includes any one of the following: a timer dedicated to switching of the remote UE from the first path to the second path; and a designated timer used in switching from the first path to a third path, where the third path includes a direct connection between the remote UE and a third base station.

Optionally, the switch module 620 is configured to: in a case that the reconfiguration message is received, start the target timer; and switch from the first path to the second path based on the reconfiguration message.

Optionally, the switch module 620 is further configured to stop the target timer in a case that at least one of the following conditions is met: that the remote UE has successfully established a PC5 connection to the first relay UE; that the remote UE has successfully sent an RRC reconfiguration message to a fourth base station; or that the first relay UE has successfully completed a random access procedure with a fifth base station.

Optionally, the switch module 620 is further configured to: suspend the target timer in a case that establishment of a PC5 connection to the first relay UE starts; and continue to run the target timer in a case that the remote UE has successfully established a PC5 connection to the first relay UE.

Optionally, the switch module 620 is configured to: in a case that the remote UE has successfully established, based on the reconfiguration message, a PC5 connection to the first relay UE, start the target timer; and switch from the first path to the second path based on the reconfiguration message.

Optionally, the switch module 620 is further configured to stop the target timer in a case that at least one of the following conditions is met: that the remote UE has successfully sent an RRC reconfiguration message to a fourth base station; or that the first relay UE has successfully completed a random access procedure with a fifth base station.

Optionally, in a case that the reconfiguration message indicates the presence of at least one relay UE, the first relay UE is any one of the at least one relay UE.

Optionally, the switch module 620 is further configured to: in a case that the reconfiguration message indicates the presence of multiple relay UEs, and that the remote UE is able to successfully establish a PC5 connection to at least one of the multiple relay UEs, determine that the remote UE has successfully established a PC5 connection to the first relay UE.

Optionally, the PC5 connection includes a PC5-S connection and/or a PC5-RRC connection.

Optionally, the switch module 620 is further configured to successfully send the RRC reconfiguration message to the fourth base station via the first relay UE.

Optionally, the switch module 620 is further configured to: in a case that the target timer has expired, and/or in a case that the number of PC5 connection attempts initiated by the remote UE has exceeded a first value but no PC5 connection has been successfully established to the first relay UE, determine that the switching result is unsuccessful switch, and perform at least one of the following: initiating, for the remote UE, an RRC connection re-establishment procedure; initiating, for the remote UE, a switching failure reporting procedure, and reporting information related to path switching failure; or initiating, for the remote UE, a relay UE reselection procedure, and/or establishing a PC5 connection to a second relay UE that has been reselected.

Optionally, the switch module 620 is further configured to: in a case that the target timer has not expired and the remote UE has not successfully established a PC5 connection to the first relay UE, and/or in a case that the number of PC5 connection attempts initiated by the remote UE has not exceeded a first value and the remote UE has not successfully established a PC5 connection to the first relay UE, perform at least one of the following: initiating, for the remote UE, an RRC connection re-establishment procedure; or initiating, for the remote UE, a relay UE reselection procedure, and/or establishing a PC5 connection to a third relay UE that has been reselected.

Optionally, the second relay UE or the third relay UE satisfies any one of the following: being obtained through relay UE reselection initiated by the remote UE; and being obtained through indication of the reconfiguration message, where the second relay UE or the third relay UE is a relay UE other than the first relay UE in multiple relay UEs indicated by the reconfiguration message.

Optionally, the switch module 620 is further configured to: in a case that the reconfiguration message indicates multiple relay UEs, select the first relay UE from the multiple relay UEs.

In the embodiments of this application, the remote UE receives a reconfiguration message, and starts a target timer in the process of switching from the first path to the second path based on the reconfiguration message. This allows the remote UE to be clear about the result of the communication path switch, thereby ensuring the smooth execution of the communication path switching process.

The communication path switching apparatus in this embodiment of this application may be an apparatus, an apparatus having an operating system, or an electronic device; or may be a component, an integrated circuit, or a chip in a terminal. The apparatus or electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which are not limited in the embodiments of this application.

The communication path switching apparatus provided in this embodiment of this application can implement the processes implemented in the method embodiments in FIG. 2 to FIG. 5, with the same technical effects achieved. To avoid repetition, details are not described herein again.

Figure 7:
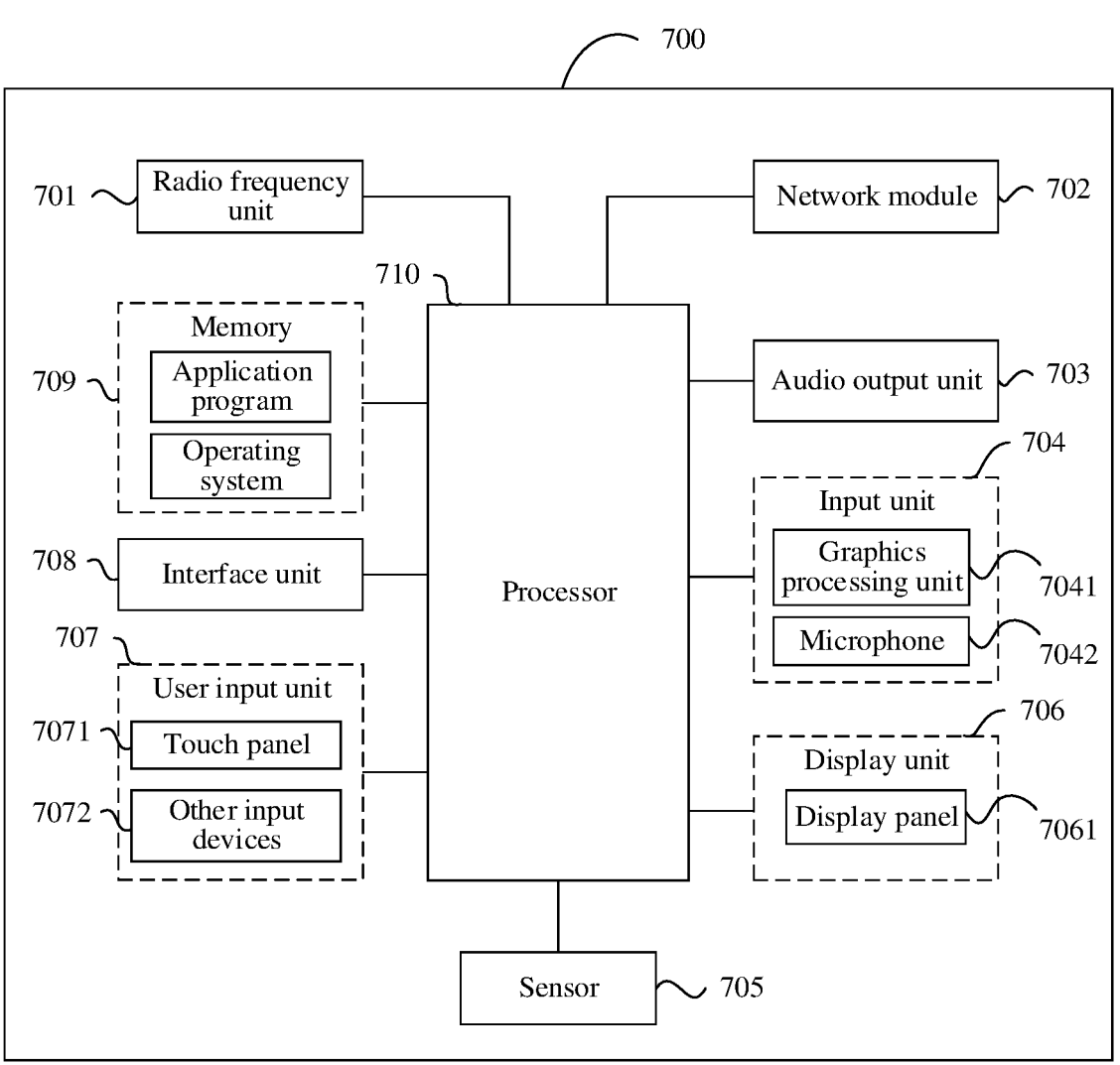
FIG. 7 is a schematic structural diagram of a terminal according to an example embodiment of this application.

An embodiment of this application further provides a terminal including a processor and a communication interface. The communication interface is coupled to the processor, and the processor is configured to execute a program or instructions to implement the method in the above method embodiments 200 to 500. It should be noted that this terminal embodiment corresponds to the foregoing terminal-side method embodiment. All implementation processes and implementations of the foregoing method embodiment are applicable to this terminal embodiment, with the same technical effect achieved. For example, FIG. 7 is a schematic diagram of a hardware structure of a terminal for implementing an embodiment of this application.

The terminal 700 includes but is not limited to at least some of a radio frequency unit 701, a network module 702, an audio output unit 703, an input unit 704, a sensor 705, a display unit 706, a user input unit 707, an interface unit 708, a memory 709, and a processor 710.

It can be understood by those skilled in the art that the terminal 700 may further include a power supply (for example, a battery) supplying power to the components. The power supply may be logically connected to the processor 710 via a power management system, so that functions such as charge management, discharge management, and power consumption management are implemented by using the power management system. The structure of the terminal shown in FIG. 7 does not constitute any limitation on the terminal, and the terminal may include more or fewer components than shown in the figure, or combine some of the components, or have different arrangements of the components. Details are not described herein.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061. The display panel 7061 may be configured in a form of a liquid crystal display, an organic light-emitting diode display, or the like. The user input unit 707 includes a touch panel 7071 and other input devices 7072. The touch panel 7071 is also referred to as a touch-screen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick. Details are not described herein.

In this embodiment of this application, the radio frequency unit 701 transmits downlink data received from a network-side device to the processor 710 for processing, and in addition, transmits uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may include a program or instruction storage area and a data storage area. The program or instruction storage area may store an operating system, an application program or instruction required by at least one function (for example, a sound play function or an image play function), and the like. Further, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, flash memory device, or other volatile solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

The processor 710 is configured to receive a reconfiguration message, where the reconfiguration message is used for indicating the remote UE to switch from a first path to a second path, where the first path includes a direct connection between the remote UE and a first base station, and the second path includes a connection between the remote UE and a second base station via a first relay UE; and start a target timer in a process of switching from the first path to the second path based on the reconfiguration message, where the target timer is used for the remote UE to determine a switching result of switching from the first path to the second path.

Optionally, the target timer includes any one of the following: a timer dedicated to switching of the remote UE from the first path to the second path; and a designated timer used in switching from the first path to a third path, where the third path includes a direct connection between the remote UE and a third base station.

Optionally, the processor 710 is configured to: in a case that the reconfiguration message is received, start the target timer; and switch from the first path to the second path based on the reconfiguration message.

Optionally, the processor 710 is further configured to stop the target timer in a case that at least one of the following conditions is met: that the remote UE has successfully established a PC5 connection to the first relay UE; that the remote UE has successfully sent an RRC reconfiguration message to a fourth base station; or that the first relay UE has successfully completed a random access procedure with a fifth base station.

Optionally, the processor 710 is further configured to: suspend the target timer in a case that establishment of a PC5 connection to the first relay UE starts; and continue to run the target timer in a case that the remote UE has successfully established a PC5 connection to the first relay UE.

Optionally, the processor 710 is configured to: in a case that the remote UE has successfully established, based on the reconfiguration message, a PC5 connection to the first relay UE, start the target timer; and switch from the first path to the second path based on the reconfiguration message.

Optionally, the processor 710 is further configured to stop the target timer in a case that at least one of the following conditions is met: that the remote UE has successfully sent an RRC reconfiguration message to a fourth base station; or that the first relay UE has successfully completed a random access procedure with a fifth base station.

Optionally, in a case that the reconfiguration message indicates the presence of at least one relay UE, the first relay UE is any one of the at least one relay UE.

Optionally, the processor 710 is further configured to: in a case that the reconfiguration message indicates the presence of multiple relay UEs, and that the remote UE is able to successfully establish a PC5 connection to at least one of the multiple relay UEs, determine that the remote UE has successfully established a PC5 connection to the first relay UE.

Optionally, the PC5 connection includes a PC5-S connection and/or a PC5-RRC connection.

Optionally, the processor 710 is further configured to successfully send the RRC reconfiguration message to the fourth base station via the first relay UE.

Optionally, the processor 710 is further configured to: in a case that the target timer has expired, and/or in a case that the number of PC5 connection attempts initiated by the remote UE has exceeded a first value but no PC5 connection has been successfully established to the first relay UE, determine that the switching result is unsuccessful switch, and perform at least one of the following: initiating, for the remote UE, an RRC connection re-establishment procedure; initiating, for the remote UE, a switching failure reporting procedure, and reporting information related to path switching failure; or initiating, for the remote UE, a relay UE reselection procedure, and/or establishing a PC5 connection to a second relay UE that has been reselected.

Optionally, the processor 710 is further configured to: in a case that the target timer has not expired and the remote UE has not successfully established a PC5 connection to the first relay UE, and/or in a case that the number of PC5 connection attempts initiated by the remote UE has not exceeded a first value and the remote UE has not successfully established a PC5 connection to the first relay UE, perform at least one of the following: initiating, for the remote UE, an RRC connection re-establishment procedure; or initiating, for the remote UE, a relay UE reselection procedure, and/or establishing a PC5 connection to a third relay UE that has been reselected.

Optionally, the second relay UE or the third relay UE satisfies any one of the following: being obtained through relay UE reselection initiated by the remote UE; and being obtained through indication of the reconfiguration message, where the second relay UE or the third relay UE is a relay UE other than the first relay UE in multiple relay UEs indicated by the reconfiguration message.

Optionally, the processor 710 is further configured to: in a case that the reconfiguration message indicates multiple relay UEs, select the first relay UE from the multiple relay UEs.

In this embodiment of this application, a reconfiguration message is received, and a target timer is started in the process of switching from the first path to the second path based on the reconfiguration message. This allows the remote UE to be clear about the result of the communication path switch, thereby ensuring the smooth execution of the communication path switching process.

An embodiment of this application further provides a non-transitory computer-readable storage medium, where the non-transitory computer-readable storage medium stores a program or instructions, and when the program or instructions are executed by a processor, the processes of the foregoing communication path switching method embodiments are implemented, with the same technical effects achieved. To avoid repetition, details are not described herein again.

The processor is a processor in the terminal described in the foregoing embodiment. The non-transitory computer-readable storage medium includes a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to execute a program or instructions, to implement the processes of the foregoing communication path switching method embodiments, with the same technical effects achieved. To avoid repetition, details are not described herein again.

It should be understood that the chip mentioned in embodiment of this application may also be referred to as a system-level chip, a system chip, a system on a chip, system-on-chip, or the like.

An embodiment of this application further provides a computer program product. The computer program product includes a processor, a memory, and a program or instructions stored in the memory and executable on the processor. When the program or instructions are executed by the processor, the processes of the foregoing communication path switching method embodiments are implemented, with the same technical effects achieved. To avoid repetition, details are not further described herein.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from that described, and various steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A communication path switching method, performed by a remote user equipment (UE), wherein the method comprises:

receiving a reconfiguration message, wherein the reconfiguration message is used for indicating the remote UE to switch from a first path to a second path, wherein the first path comprises a direct connection between the remote UE and a first base station, and the second path comprises a connection between the remote UE and a second base station via a first relay UE; and starting a target timer in a process of switching from the first path to the second path based on the reconfiguration message, wherein the target timer is used for the remote UE to determine a switching result of switching from the first path to the second path; wherein the starting a target timer in a process of switching from the first path to the second path based on the reconfiguration message comprises:

in a case that the reconfiguration message is received, starting the target timer; and switching from the first path to the second path based on the reconfiguration message;

after the switching from the first path to the second path, the method further comprises:

stopping the target timer in a case that the remote UE has successfully sent a radio resource control (RRC) reconfiguration message to a fourth base station via the first relay UE.

2. The method according to claim 1, wherein the target timer comprises any one of the following:

a timer dedicated to switching of the remote UE from the first path to the second path; and a designated timer used in switching from the first path to a third path, wherein the third path comprises a direct connection between the remote UE and a third base station.

3. The method according to claim 1, wherein after the switching from the first path to the second path, the method further comprises:

suspending the target timer in a case that establishment of a PC5 connection to the first relay UE starts; and continuing to run the target timer in a case that the remote UE has successfully established a PC5 connection to the first relay UE.

4. The method according to claim 1, wherein in a case that the reconfiguration message indicates presence of at least one relay UE, the first relay UE is any one of the at least one relay UE.

5. The method according to claim 1, wherein the PC5 connection comprises a PC5-S connection and/or a PC5-RRC connection.

6. The method according to claim 1, wherein that the remote UE has successfully sent an RRC reconfiguration message to a fourth base station comprises:

that the remote UE has successfully sent the RRC reconfiguration message to the fourth base station via the first relay UE.

7. The method according to claim 1, wherein after the starting a target timer in a process of switching from the first path to the second path based on the reconfiguration message, the method further comprises:

in a case that the target timer has expired, and/or in a case that the number of PC5 connection attempts initiated by the remote UE has exceeded a first value but no PC5 connection has been successfully established to the first relay UE, determining that the switching result is unsuccessful switch, and performing at least one of the following:

initiating, by the remote UE, a radio resource control (RRC) connection re-establishment procedure;

initiating, by the remote UE, a switch failure reporting procedure, and reporting information related to path switching failure; or initiating, by the remote UE, a relay UE reselection procedure, and/or establishing a PC5 connection to a second relay UE that has been reselected.

8. The method according to claim 1, wherein after the starting a target timer in a process of switching from the first path to the second path based on the reconfiguration message, the method further comprises:

in a case that the target timer has not expired and the remote UE has not successfully established a PC5 connection to the first relay UE, and/or in a case that the number of PC5 connection attempts initiated by the remote UE has not exceeded a first value and the remote UE has not successfully established a PC5 connection to the first relay UE, performing at least one of the following:

initiating, by the remote UE, a radio resource control (RRC) connection re-establishment procedure; or initiating, by the remote UE, a relay UE reselection procedure, and/or establishing a PC5 connection to a third relay UE that has been reselected.

9. The method according to claim 7, wherein the second relay UE or the third relay UE satisfies any one of the following:

being obtained through relay UE reselection initiated by the remote UE; and being obtained through indication of the reconfiguration message, wherein the second relay UE or the third relay UE is a relay UE other than the first relay UE in multiple relay UEs indicated by the reconfiguration message.

10. The method according to claim 1, wherein before the starting a target timer in a process of switching from the first path to the second path based on the reconfiguration message, the method further comprises:

in a case that the reconfiguration message indicates multiple relay UEs, selecting the first relay UE from the multiple relay UEs.

11. A terminal, wherein the terminal is a remote user equipment (UE), comprising a processor, a memory, and a program or instructions stored in the memory and executable on the processor, wherein the program or instructions, when executed by the processor, cause the remote UE to perform:

receiving a reconfiguration message, wherein the reconfiguration message is used for indicating the remote UE to switch from a first path to a second path, wherein the first path comprises a direct connection between the remote UE and a first base station, and the second path comprises a connection between the remote UE and a second base station via a first relay UE; and starting a target timer in a process of switching from the first path to the second path based on the reconfiguration message, wherein the target timer is used for the remote UE to determine a switching result of switching from the first path to the second path; wherein the program or instructions, when executed by the processor, cause the remote UE to perform:

in a case that the reconfiguration message is received, starting the target timer; and switching from the first path to the second path based on the reconfiguration message; and the program or instructions, when executed by the processor, cause the remote UE to further perform:

stopping the target timer in a case that the remote UE has successfully sent a radio resource control (RRC) reconfiguration message to a fourth base station.

12. The terminal according to claim 11, wherein the target timer comprises any one of the following:

a timer dedicated to switching of the remote UE from the first path to the second path; and a designated timer used in switching from the first path to a third path, wherein the third path comprises a direct connection between the remote UE and a third base station.

13. The terminal according to claim 11, wherein the program or instructions, when executed by the processor, cause the remote UE to further perform:

in a case that the target timer has expired, and/or in a case that the number of PC5 connection attempts initiated by the remote UE has exceeded a first value but no PC5 connection has been successfully established to the first relay UE, determining that the switching result is unsuccessful switch, and performing at least one of the following:

initiating a radio resource control (RRC) connection re-establishment procedure;

initiating a switch failure reporting procedure, and reporting information related to path switching failure; or initiating a relay UE reselection procedure, and/or establishing a PC5 connection to a second relay UE that has been reselected.

14. The terminal according to claim 13, wherein the second relay UE or the third relay UE satisfies any one of the following:

being obtained through relay UE reselection initiated by the remote UE; and being obtained through indication of the reconfiguration message, wherein the second relay UE or the third relay UE is a relay UE other than the first relay UE in multiple relay UEs indicated by the reconfiguration message.

15. The terminal according to claim 11, wherein the program or instructions, when executed by the processor, cause the remote UE to further perform:

suspending the target timer in a case that establishment of a PC5 connection to the first relay UE starts; and continuing to run the target timer in a case that the remote UE has successfully established a PC5 connection to the first relay UE.

16. The terminal according to claim 11, wherein in a case that the reconfiguration message indicates presence of at least one relay UE, the first relay UE is any one of the at least one relay UE.

17. The terminal according to claim 16, wherein the PC5 connection comprises a PC5-S connection and/or a PC5-RRC connection.

18. The terminal according to claim 11, wherein the program or instructions, when executed by the processor, cause the remote UE to perform:

that the remote UE has successfully sent the RRC reconfiguration message to the fourth base station via the first relay UE.

19. The terminal according to claim 11, wherein the program or instructions, when executed by the processor, cause the remote UE to further perform:

in a case that the target timer has not expired and the remote UE has not successfully established a PC5 connection to the first relay UE, and/or in a case that the number of PC5 connection attempts initiated by the remote UE has not exceeded a first value and the remote UE has not successfully established a PC5 connection to the first relay UE, performing at least one of the following:

initiating, by the remote UE, a radio resource control (RRC) connection re-establishment procedure; or initiating, by the remote UE, a relay UE reselection procedure, and/or establishing a PC5 connection to a third relay UE that has been reselected.

20. The terminal according to claim 11, wherein the program or instructions, when executed by the processor, cause the remote UE to further perform:

in a case that the reconfiguration message indicates multiple relay UEs, selecting the first relay UE from the multiple relay UEs.

\* \* \* \* \*